United States Patent [19]

Flemming

[11] 4,221,997
[45] Sep. 9, 1980

[54] ARTICULATED ROBOT ARM AND METHOD OF MOVING SAME

[75] Inventor: John P. W. Flemming, Hopewell Township, Mercer County, N.J.

[73] Assignee: Western Electric Co., Inc., New York, N.Y.

[21] Appl. No.: 970,729

[22] Filed: Dec. 18, 1978

[51] Int. Cl.² .......................................... G05B 19/22
[52] U.S. Cl. ................................... 318/574; 318/568; 414/4
[58] Field of Search ....................... 318/568, 574, 569; 414/4, 5; 364/513

[56] References Cited

U.S. PATENT DOCUMENTS

| | | | |
|---|---|---|---|
| 3,589,134 | 6/1971 | Hackmann | 364/120 |
| 3,648,143 | 3/1972 | Harper et al. | 318/568 |
| 3,854,284 | 10/1974 | Taguchi et al. | 318/567 X |
| 3,920,972 | 11/1975 | Dudley et al. | 364/513 |
| 4,150,329 | 4/1979 | Dahlstrom | 318/569 X |

Primary Examiner—B. Dobeck
Attorney, Agent, or Firm—B. W. Sheffield

[57] ABSTRACT

An articulated robot arm (10) comprises n arm sections (13, 16, 18, 21) pivotally mounted one to the other. A plurality of independently controlled servomotors (12, 14, 17, 19) at each of the arm joints moves the tip (22) of the arm towards the desired location. All arm angles are measured with respect to a common reference plane, e.g. the horizon.

7 Claims, 3 Drawing Figures

ARTICULATED ROBOT ARM AND METHOD OF MOVING SAME

TECHNICAL FIELD

Broadly speaking, this invention relates to an industrial robot. More particularly, in a preferred embodiment, this invention relates to methods and apparatus for accurately positioning the extremity of the arm of such a robot.

BACKGROUND OF THE INVENTION

The use of computer-controlled robots is becoming increasingly widespread in industry. Once their initial purchase cost has been amortized, experience has shown that robots are less expensive to operate, and considerably more reliable, than the human operators they replace, especially in repetitive assembly applications where human judgement is not a critical factor.

A typical robot arm will comprise three or more arm sections operatively coupled by computer controlled joints which may be analogized, for example, to the human shoulder, elbow and wrist joints. A "hand" is typically attached to the extremity of the arm to manipulate the workpiece, as required by the particular task to be performed.

For such an arm to be useful it is, of course, necessary to be able to move the arm so that the "hand" can pick up, manipulate, and then set down the workpiece. Typically, this is accomplished by noting the coordinates of the beginning and end positions of the hand and then computing the precise angle through which each joint must be rotated so that the hand reaches the desired end position.

In such an arrangement, the ultimate position of the hand depends not only on the degree of rotation of the "wrist" joint, but also on the degree of rotation of all other joints upstream of the wrist joint. Because of this interdependence, computation of the changes necessary in the various joint angles of the arm becomes exceedingly complex. In addition, because of the computational precision necessary, the time to complete the computation is relatively long, especially if an 8-bit microprocessor is used to perform the calculations.

SUMMARY OF THE INVENTION

As a solution to these and other problems, I propose to define the position of the arm by means of joint angles which are measured with respect to a fixed reference plane, for example the horizon, rather than by reference to the adjacent arm sections. Such an arrangement significantly reduces the complexity of the computations involved and results in a useful increase in the robot's throughput.

More specifically, in a preferred embodiment, my invention comprises a method of moving the extremity of an articulated, robot arm from a first to a second location, the arm including n arm sections pivotally mounted one to the other thereby defining n arm joints, the method comprising the step of rotating m of the joints to move the arm extremity towards the second location, $1 \leq m \leq n$, the angle through which each of the joints is thereby rotated being measured with respect to a common, fixed reference plane.

The invention and its mode of operation will be more fully understood from the following detailed description, when taken with the appended drawings, in which:

DETAILED DESCRIPTION

Figure 1:
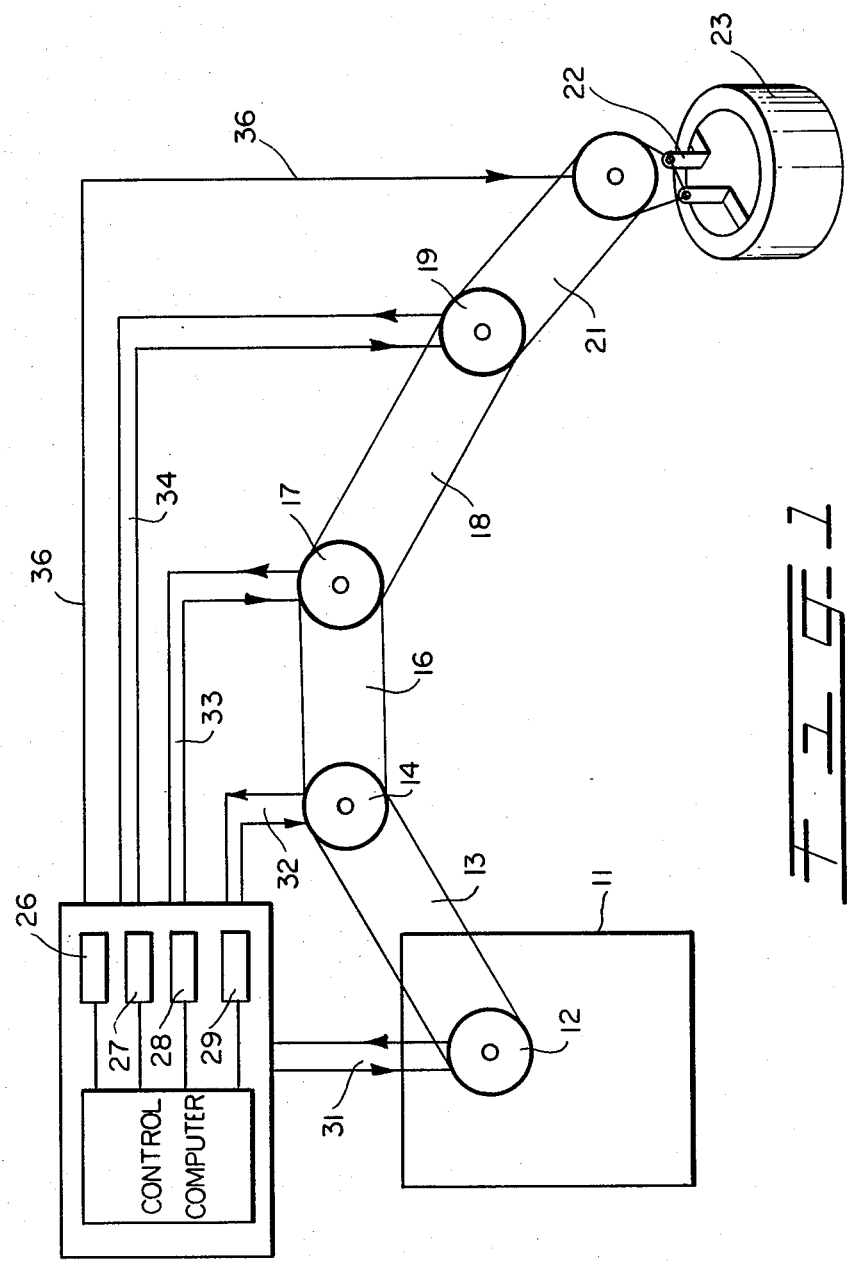
FIG. 1 is a partially schematic, partially diagrammatic drawing of an illustrative computer controlled robot arm according to the invention.

The invention will now be described with reference to a robot arm having a plurality of arm sections and a corresponding plurality of independently-controlled servomotors at each of the arm joints. To simplify the explanation it will be assumed that arm motion occurs in only one plane, i.e., the plane of the drawing. One skilled in the art will appreciate, however, that the invention has a broader application and that the illustrative embodiment disclosed is not intended to limit the scope of the appended claims.

FIG. 1 depicts in partially schematic, partially diagramatic form an illustrative robot arm according to the invention. As shown, arm 10 comprises a base member 11 upon which is mounted a first servomotor 12. The shaft of servomotor 12 is connected, via some suitable gear mechanism, to the proximal end of a first arm section 13. The distal end of arm section 13 is connected to a second servomotor 14, thence, to the proximal end of a second arm section 16. The distal end of arm section 16 is connected to a third servomotor 17, thence, to the proximal end of a third arm section 18. Arm section 18, in turn, is connected at its distal end to a fourth servomotor 19 thence, to the proximal end of a fourth arm section 21. A mechanical hand 22 is connected to the distal end of the fourth arm section 21 and supports a typical workpiece 23. The servomotors 12, 14, 17 and 19 are respectively connected to, and controlled by, digital computers 26 through 29, via control lines 31 through 34, respectively. A fifth control line 36 is connected to a control circuit 37 to control the mechanical hand 22. Each of the servomotors includes some suitable means for generating a signal which is representative of the angle that the corresponding arm section assumes with respect to an arbitrary reference plane, for example, the horizon. As will be more fully explained below, this information is required so that the computers 12, 14, 17 and 19 can calculate the change in angle that their respective servomotors must make to move the hand to the desired location.

It should be appreciated that the arrangement shown in FIG. 1 is merely illustrative. For example, under some circumstances, it might be preferable to physically locate the servomotors on the base 11 and to couple the motion of the shafts to the corresponding joints by means of a series of endless drive belts, or the like. This latter arrangement would simplify measurement of the angle that each arm section makes with the reference plane, for example, by permitting the angles to be measured by means of shaft encoders mounted to each servomotor. If the reference plane is the horizon, for example, the system could be calibrated by extending the arm perfectly horizontal (i.e. so that all of the arm sections make an angle of 0° with respect to the horizon) and then rotating each encoders with respect to its servomotor shaft, such that the digital output therefrom is zero. An alternate way to determine the angle that each arm section makes with respect to the reference plane is to sum the changes in the included angles that are made by each pair of upstream arm-sections and to store the results of each summation for comparison with subsequent computations. In this latter case, calibration of the system would involve adjusting the shaft encoder, or other angle transducer, such that the output from the encoder was zero when adjacent arm sections were parallel.

Figure 2:
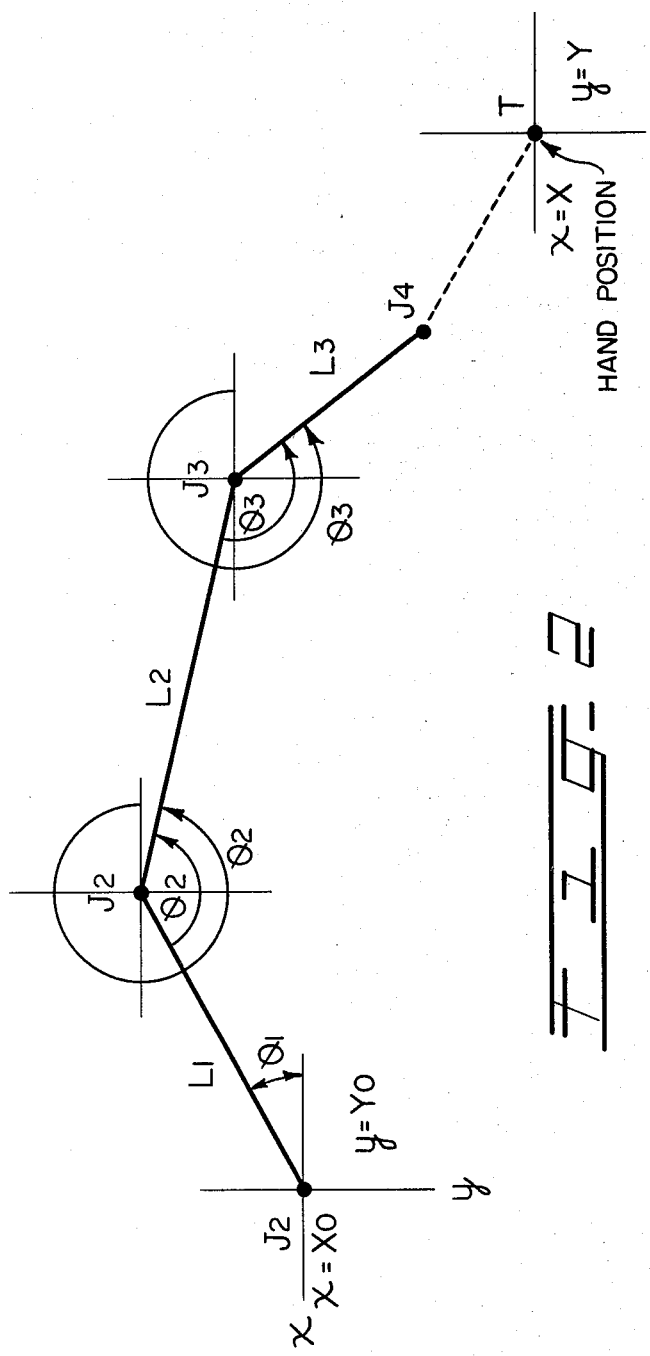
FIG. 2 is a sketch illustrating the inherent principle of operation of the arm shown in FIG. 1.

Turning to FIG. 2, the mathematical principles underlying the invention will now be stated. It will be apparent that, in essence, we are concerned with accurately positioning the tip T of a robot arm having N-joints, the arm moving only in the plane of the paper. The problem is to relate the coordinates (X,Y) of tip T to the angle $\theta_n$ between each arm section and the common reference plane, i.e., the horizon, $n=1, 2 \ldots N$, and to compute how to change the angles $\theta_n$ to move the tip of the arm to a new position having the coordinates $(X_E, Y_E)$. In the prior art, the coordinate position (X,Y) was calculated from the joint angles $\theta_n^*$ which, as will be seen from the drawing, are the angles lying between adjacent pairs of arm sections. As previously noted, the problem with this prior art approach is that the final position of a tip which is moved by a change in a given joint angle depends on the value of all upstream joint angles, which leads to great difficulty of control. In the instant invention, each angle $\theta_n$ is independently servoed, so that when one of the angles is changed all other $\theta_n$'s, may be controlled by their respective computers so that, if desired, they remain constant with respect to the reference horizon. In a real-life situation, all $\theta_n$'s will change, but the computation of the necessary changes in angle may be performed as if each angle changed independently, a considerable simplification.

Mathematically, the position of the tip T is given by the following equations:

$$X = \sum_{n=1}^{N} L_n \cos \theta_n$$
$$Y = \sum_{n=1}^{N} L_n \sin \theta_n$$
Thus,
$$\frac{\partial X}{\partial \theta_n} = -L_n \sin \theta_n$$
$$\frac{\partial Y}{\partial \theta_n} = L_n \cos \theta_n$$

Figure 3:
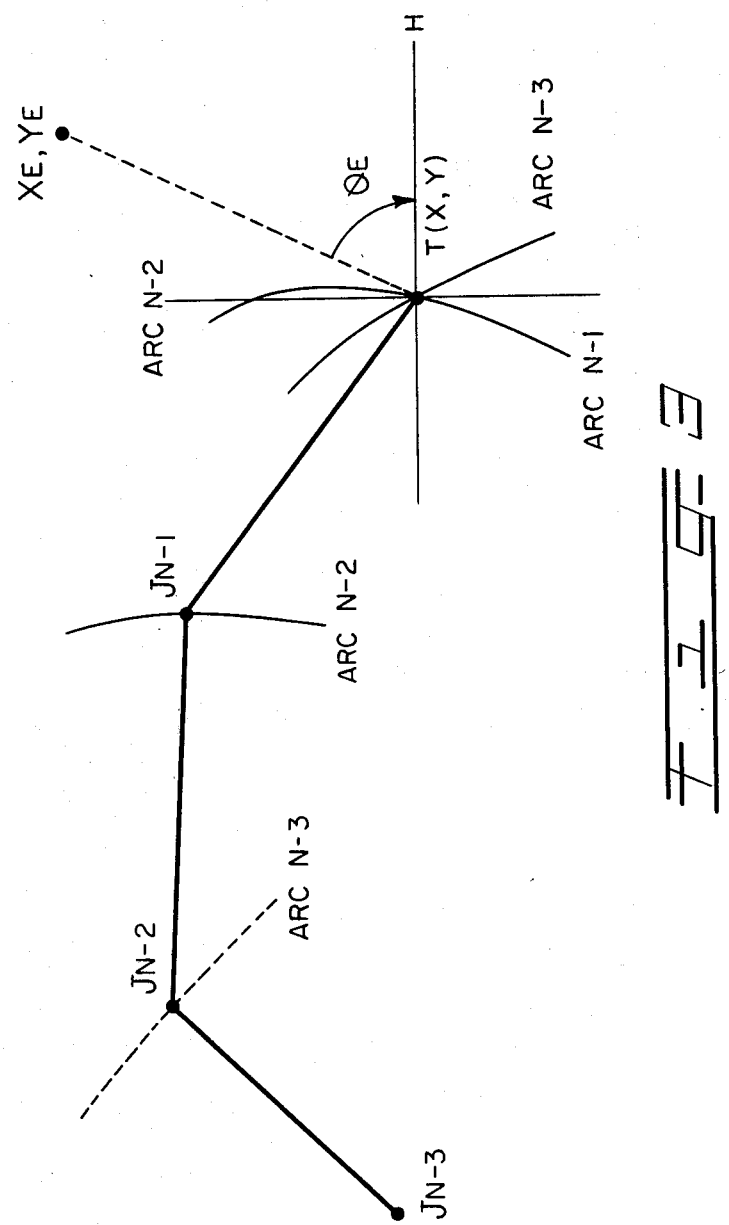
FIG. 3 is another sketch illustrating the principles of the invention.

In physical terms, the above equations mean that if we change $\theta_2$, say, and hold $\theta_3, \theta_4 \ldots \theta_n$ constant, the path along which tip T travels will have the same arc as the path travelled by joint $J_3$ which depends only on the change in $\theta_2$ and the value of $L_2$, the length of the corresponding arm-section. In other words, it is not necessary to consider any parameters except $\theta_2$ and $L_2$ to determine the relative motion of the tip. By way of contrast, had we changed $\theta_2^*$ while keeping $\theta_3^*, \theta_4^* \ldots \theta_n^*$ constant, the arc moved by the tip would have had a radius equal to the distance between J and the tip and this, of course, depends on the exact values of $\theta_3^*, \theta_4^* \ldots \theta_n^*$. This will become clearer when FIG. 3 is examined. Suppose it is desired to move the tip T from the point (X,Y) to a nearby new position $(X_E, Y_E)$. FIG. 3 depicts the three arcs that the tip would move through if joints $J_{n-1}$, $J_{n-2}$ and $J_{n-3}$ were each separately changed. The problem is to decide which arcs to move along and by how much. Since we have assumed that the coordinates $(X_E, Y_E)$ are nearby to (X,Y), the interactions between joints can be ignored and, in principle, one could calculate how to move the arm by a vector sum of the motion along the arcs. However, it is almost as accurate, and far easier, to allow the joints to move in such a way that the joint velocity is chosen according to how effectively the joint will move the tip towards the required new position.

There are several ways of doing this, for example the function:

$$V_n = K \sin (\theta_E - \theta_n)$$

will move joint n in the required manner. For stability reasons, it is advantageous to add some degree of proportional control to the motion, for example according to the equation $$V_n = KL_E \sin (\theta_E - \theta_n)$$

where $L_E$ is the distance between P(X,Y) and $P(X_E, Y_E)$ and $V_n$ is the joint velocity. In the instant invention, the path which is taken by the arm is not the optimum path, which would, of course, be a straight line from coordinates P(X,Y) to coordinates $P(X_E, Y_E)$, however, it is very nearly the optimum path.

Because each joint is servoed independently of the other joints, it is possible to substitute an analog control system for the digital system shown. In that case the input to the analog system is merely a string of position coordinates. The interaction between joints is taken care of by the fact that the joint angels are referred to the fixed reference plane.

The advantage of the novel method and apparatus disclosed and claimed herein is that it is no longer necessary to make lengthly calculations to accurately control the position of the arm, which yields the desired advantage of high speed and precise control.

One skilled in the art may make various changes and substitutions to the layout of parts shown without departing from the spirit and scope of the invention.

What is claimed is:

1. A method of moving the extremity of an articulated, robot arm from a first to a second location, said arm including n arm sections pivotally mounted one to the other thereby defining n arm joints, said method comprising the steps of:
   measuring the angle that each of said arm sections makes with respect to a common, fixed reference plane; and then
   rotating m of said joints to move said extremity towards said second location, $1 \leq m \leq n$, the rotation of each joint being made proportional to the desired change in the corresponding angle.

2. The method according to claim 1 wherein said first and second locations are respectively defined by the co-ordinates X,Y and $X_E, Y_E$ in a Cartesian system having an axis parallel to said reference plane, said joint rotating step further comprising:
   rotating each of said joints such that the velocity of the ith joint is proportional to $\sin (\theta e - \theta i)$, where $\theta i$ and $\theta e$ are respectively the angles, with respect to said reference plane, made by the ith arm section and the vector from X,Y to $X_E, Y_E$, $i=1, 2, 3 \ldots m$.

3. The method according to claim 2 wherein said joint rotating step further comprises:
   rotating each of said joints with a velocity which is, in addition, proportional to the length of said vector.

4. The method according to claim 1 wherein the change in angle which results from said joint rotating step is determined, for the ith joint, $1 \leq i \leq m$, by the further step of:

summing the change in the included angle of the first through the ith joints, said included angle being defined as the angle established between the adjacent arm sections at each of said joints.

5. An articulated robot arm, said arm having a mechanical hand at one extremity thereof for manipulating a workpiece, which comprises:

a base member;

n arm sections, the proximal end of the first of said arm sections being rotatably mounted to aid base, the proximal end of the second of said arm sections being rotatably mounted to the distal end of said first arm section and so on, the distal end of the nth arm section supporting said hand;

means for sensing the angle that each of said arm sections makes with respect to a common, fixed reference plane; and means, responsive to a command signal from an external source, for altering the angle that m of said arm sections make with respect to said reference plane, $1 \leq m \leq n$, thereby to move said hand from a first to a second location.

6. The apparatus according to claim 5 wherein said angle sensing means comprises, for each arm section:

means for measuring the included angle established by the adjacent arm sections at each joint of the arm, said arm further comprising:

means for summing the included angles for the first through ith joints, $1 \leq i \leq m$.

7. The apparatus according to claim 6 further comprising:

means, responsive to successive outputs of said summing means, for computing the change in the included angles for the first through ith joints, $1 \leq i \leq m$.

* * * * *

UNITED STATES PATENT OFFICE
CERTIFICATE OF CORRECTION

PATENT NO. : 4,221,997

DATED : September 9, 1980

INVENTOR(S) : J. P. W. Flemming

It is certified that error appears in the above-identified patent and that said Letters Patent are hereby corrected as shown below:

In the claims, column 5, claim 5, line 12, "aid base" should read --said base--.

Signed and Sealed this

Sixth Day of January 1981

[SEAL]

Attest:

SIDNEY A. DIAMOND

Attesting Officer

Commissioner of Patents and Trademarks